United States Patent [19]
Johnson et al.

[11] 3,945,215
[45] Mar. 23, 1976

[54] LOW-LOSS, FLUID HELIUM TRANSFER LINE SUITABLE FOR EXTENDED LENGTHS

[75] Inventors: Robert W. Johnson, Holbrook; Paul R. Doherty, Woburn, both of Mass.

[73] Assignee: Cryogenic Technology, Inc., Waltham, Mass.

[22] Filed: Feb. 14, 1974

[21] Appl. No.: 443,140

[52] U.S. Cl. .................. 62/55; 285/47; 285/DIG. 5
[51] Int. Cl.² ........................................ F17C 17/02
[58] Field of Search ............. 62/55; 285/47, DIG. 5

[56] References Cited

UNITED STATES PATENTS

| | | | |
|---|---|---|---|
| 3,068,026 | 12/1962 | McKamey | 62/55 |
| 3,207,533 | 9/1965 | Van Gundy et al. | 285/47 X |
| 3,371,946 | 3/1968 | Bleyle, Jr. et al. | 285/47 |
| 3,399,691 | 9/1968 | Schoch et al. | 62/55 X |
| 3,775,989 | 3/1971 | Mursinna et al. | 62/55 |
| 3,823,569 | 7/1974 | Sellmaier et al. | 62/55 |

Primary Examiner—Carroll B. Dority, Jr.
Assistant Examiner—Ronald C. Capossela
Attorney, Agent, or Firm—Griffin, Branigan & Butler

[57] ABSTRACT

A helium transfer line adapted to be constructed in extended lengths and to carry liquid helium and/or 4.2°K helium gas with minimum loss of refrigeration capacity due to heat leaks into and through the line. The transfer line, in its basic structure, comprises a fluid helium process line, radiation shielding, vacuum jacketing and a cryogenic coolant line in thermal contact with the radiation shielding and carrying a cryogenic coolant such as liquid nitrogen. Line components, comprising heat-stationed bayonets with or without $LN_2$ bypass lines, expansion/contraction joints, and flexible sections and, if desired, valves, ell-sections and tee-sections, are designed to be integrated into the basic structure so that this structure may be carried through essentially the entire length of the line. Various combinations of these components in the transfer line make it possible to adapt the transfer line to a wide range of requirements dictated by such factors as space, and the relative positions of the two or more points of connection, i.e., a source of liquid helium and a refrigeration load to be cooled by the liquid helium.

31 Claims, 19 Drawing Figures

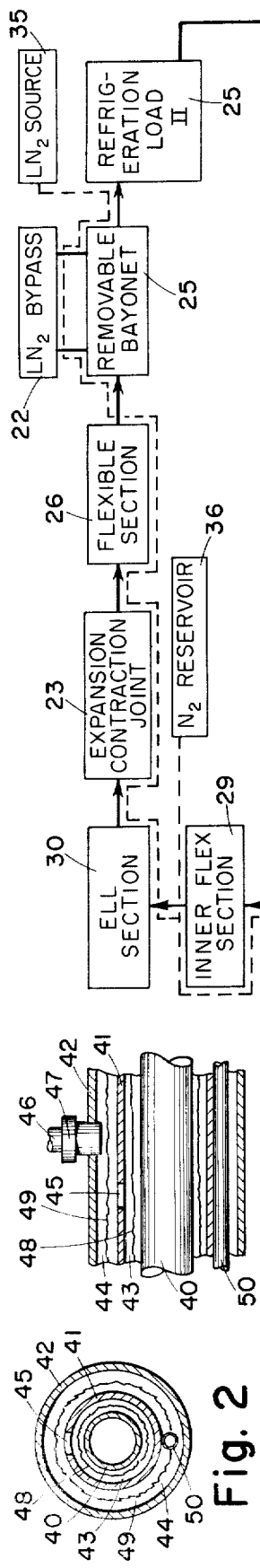
Fig. 2
Fig. 3
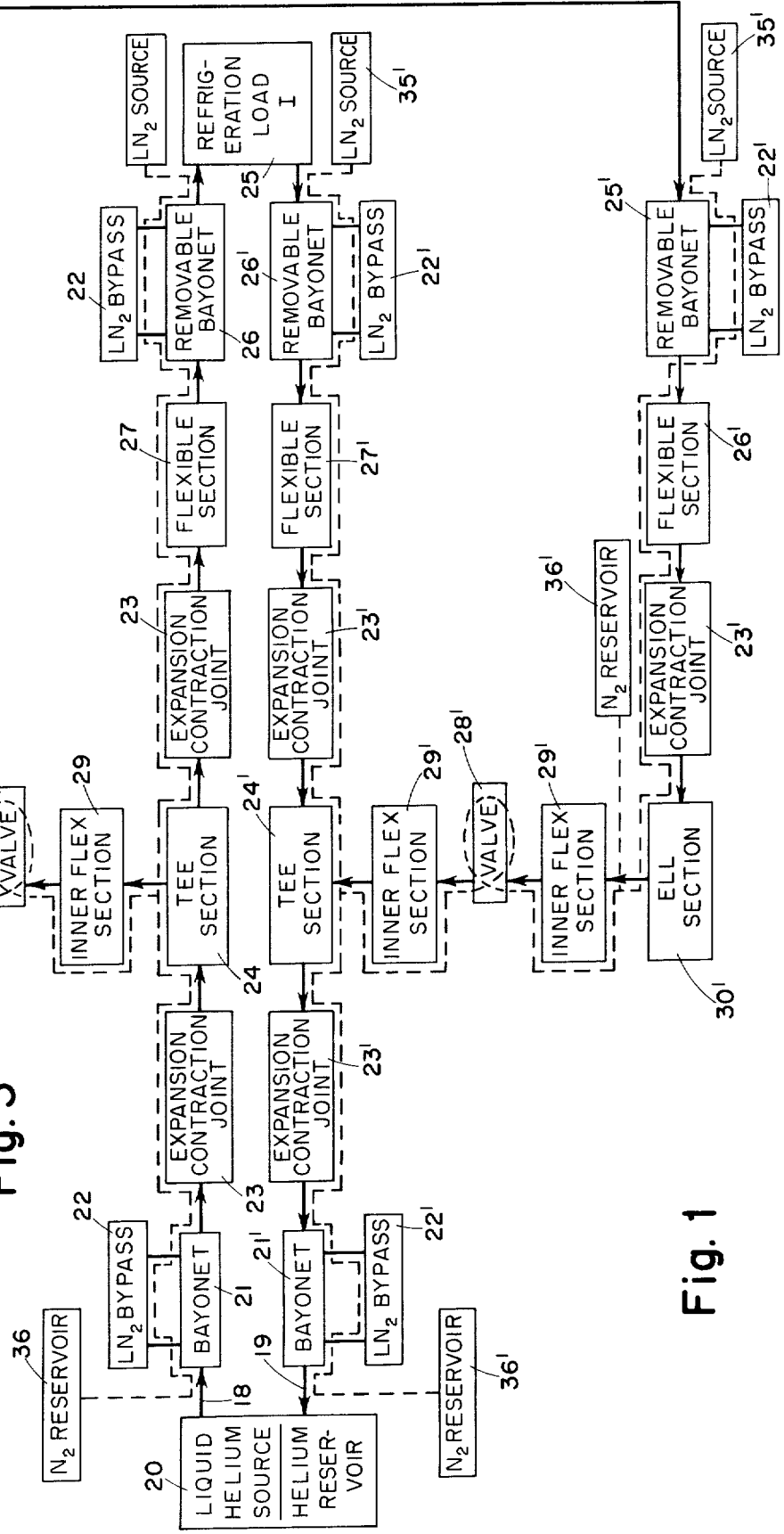
Fig. 1

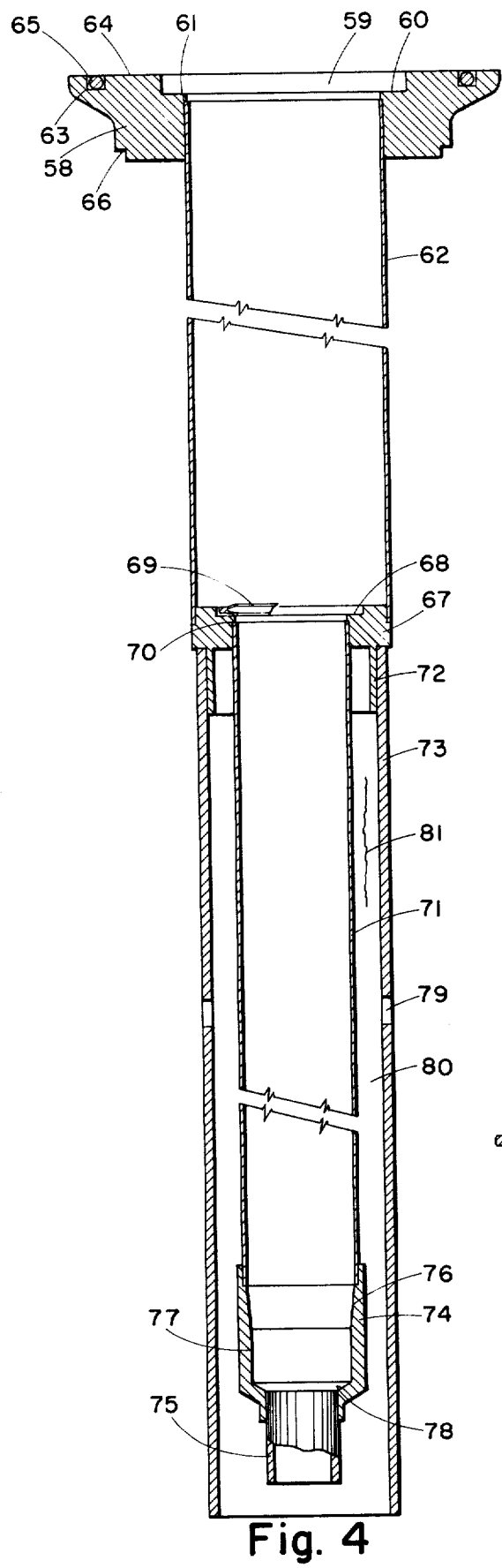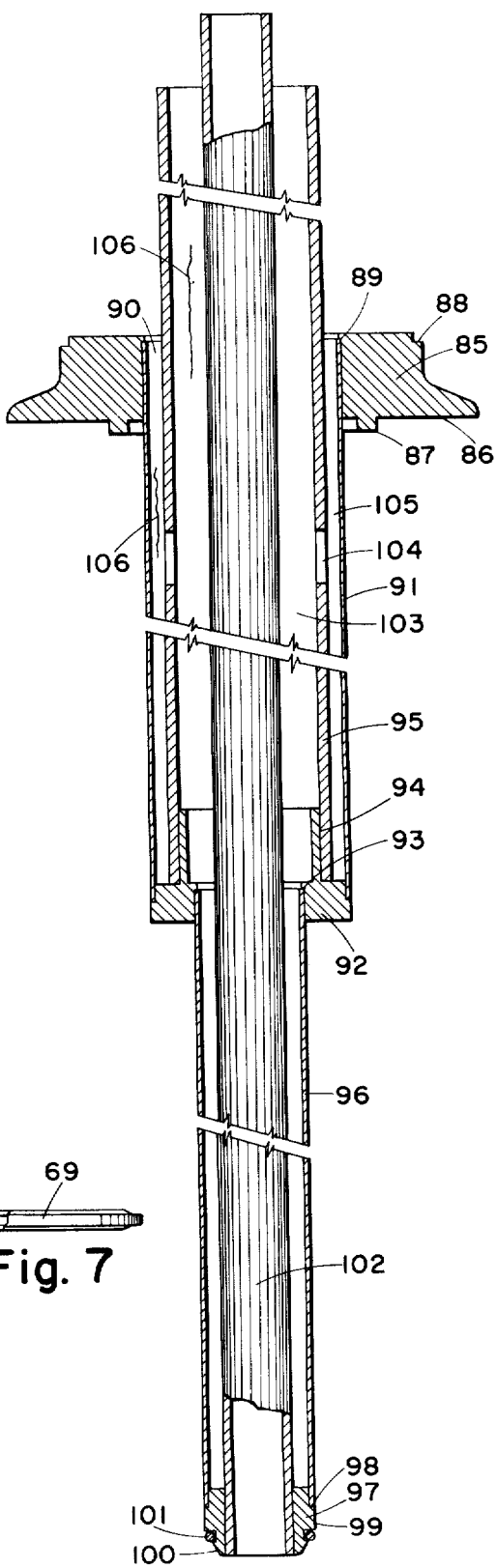
Fig. 4   Fig. 7   Fig. 5

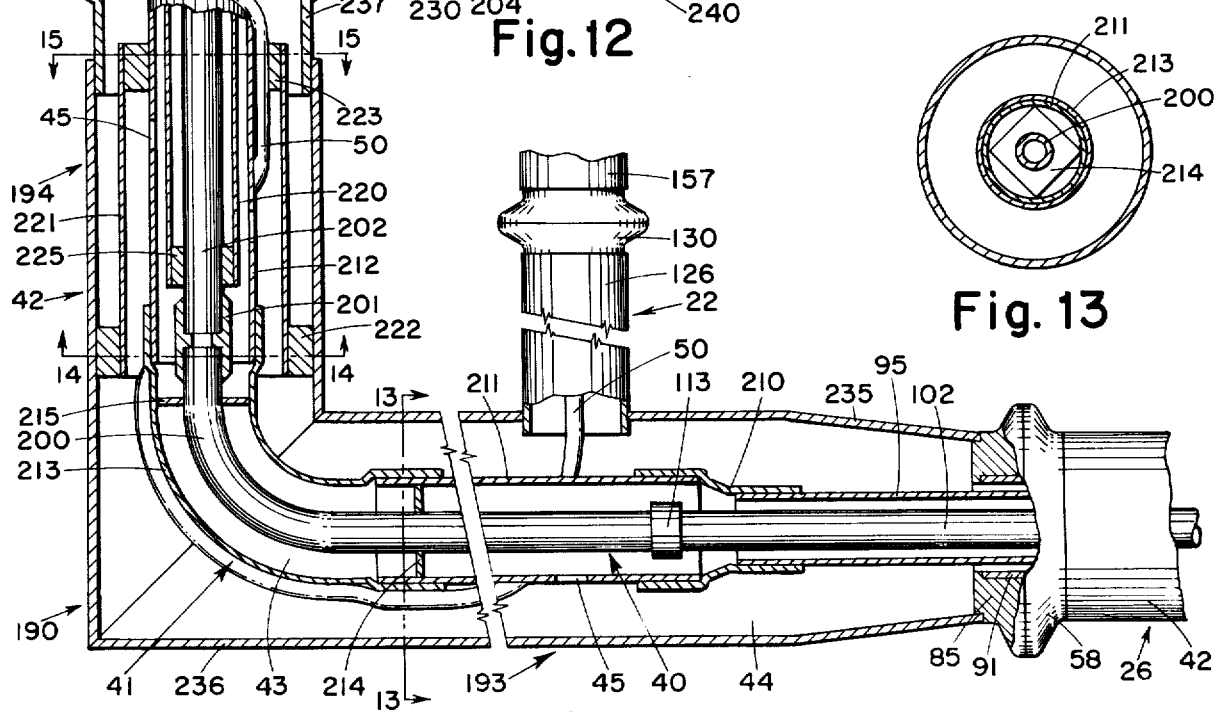

LOW-LOSS, FLUID HELIUM TRANSFER LINE SUITABLE FOR EXTENDED LENGTHS

This invention relates to the transfer of a cryogenic fluid between two points such as a source and a refrigeration load and more particularly to a transfer line suitable for conducting liquid helium and 4.2° K helium gas between a source and load over an extended distance with minimum loss due to vaporization.

The transfer of liquid helium and/or helium gas at 4.2° K from a source (a liquefier or an insulated storage vessel) to a refrigeration load and back to a reservoir presents few problems in those cases where the source and load are separated by only a few feet and where the transfer line and its connections with the source and load remain relatively fixed. However, when the distance between the liquid helium source and the refrigeration load is greater than about 25 feet, expansions and contractions in the transfer line brought about by periodic heating and cooling present sealing problems; and when it is necesssary to make additional connections to the transfer line or to incorporate sufficient flexibility into the line to allow for some shifting of the relative positions of the load and the source, these problems of expansion and contraction become even more pronounced. Connections between transfer line sections, between the line and the source and load as well as between the line and such auxiliary equipment as valves and the like have always been made by so-called "bayonet" connectors which in turn have introduced relatively large heat leaks into the system. Moreover, the longer the transfer line and the more connections made, the greater all heat leaks become and they finally reach a level which makes the transfer of liquid helium impractical if not impossible. Although it has been customary to provide radiation shields for some sections of the prior art transfer lines normally no more than about twenty feet in length and to cool these sections if desired, it has not been possible to provide a transfer line of extended length having cooled radiation shielding along essentially its entire length. One of the primary reasons that it is has not been possible to provide an essentially continuous, cooled radiation shield on prior art transfer lines has been the fact that the various components (connectors, valves, etc.) in the line have not been designed and constructed to retain the basic structure of the transfer line throughout its entire length.

With the advent of the use of liquid helium to cool industrial-sized equipment (superconducting magnets, superconducting transmission lines, and superconducting loops for electrical storage, and the like) there arises the need for transferring large quantities of liquid helium and/or 4.2° K helium gas to provide the refrigeration required to maintain such equipment incorporating superconductors in their superconducting state. Since it is not always feasible to locate one or more helium liquefiers immediately adjacent the equipment which embodies the refrigeration load; and since it is desirable to be able to use one liquid helium source to supply refrigeration to more than one load either simultaneously or alternatively, or to use more than one liquid helium source in connection with single or multiple loads, it is necessary to be able to change transfer line connections without sacrificing the efficiency of the over-all line. This in turn requires a degree of flexibility in a transfer line to compensate for any changes in the relative position of the liquid helium source and refrigeration load.

The steady refrigeration of a load such as a superconducting magnet must be provided by helium in the liquid state and/or as 4.2° K gas. Thus it is essential for efficient refrigeration of such a load to deliver as much as possible of the liquid helium from the source to the load in the liquid state, a requirement which in turn demands minimizing heat leaks along the entire transfer line into the process line carrying the liquid or cold gaseous helium. Since the latent heat of vaporization of liquid helium is extremely low (82.46 joules per mole at 4.2° K) the need for minimum heat loss is immediately apparent. Although refrigeration is accomplished by the use of liquid helium and/or 4.2° K gas, it will be convenient hereinafter to refer to this refrigerant as "liquid" helium, it being understood that the term includes 4.2° K gas as well and that the transfer line of this invention is suitable for carrying both liquid helium and 4.2° K gas.

Refrigeration on an industrial or large scale by use of liquid helium requires a relatively large input of energy to develop the liquid helium. Thus for example, some 1500–2000 Btu of power is required to develop one watt of refrigeration (using for example a large helium cryostat such as described in U.S. Pat. No. 2,458,894). It therefore becomes of paramount importance to maintain liquid helium losses at a minimum during transfer. The minimizing of transfer losses means that a smaller liquefier can be used to refrigerate a given load or that a liquefier of a given size can refrigerate a larger load.

The transfer line of this invention achieves minimum heat loss, can be made in extended lengths, and is flexible in design. As will be evident in the following detailed description, this transfer line is formed of several different components, each designed to accomplish a specific function in the transfer line, connected by unique bayonet connectors. The entire line is protected by a cryogenically cooled radiation shield made possible through the construction and use of these line components.

It is therefore a primary object of this invention to provide and improved helium transfer line for conducting liquid helium as well as 4.2° K gaseous helium between a source and one or more loads. It is another object to provide a transfer line of the character described which may be formed in extended lengths and which achieves a very low loss in refrigerant capacity in transfer and thus results in a saving of energy required in the refrigeration of a load. Yet another object of this invention is to provide a liquid helium transfer line which incorporates a cryogenically-cooled radiation shield, which is easily adaptable to change in location of either the source or the load, which can be used to supply liquid helium to a plurality of loads either simultaneously or alternatively, and which is flexible in its construction so that is may be used in situations where refrigeration demands may change. Other objects of the invention will in part be obvious and will in part be apparent hereinafter.

The liquid helium transfer line of this invention comprises, in combination, a liquid helium process line, expansion coupling means for joining discrete lengths of the line, heat-stationed bayonet connecting means and cryogenically-cooled radiation shielding means extending essentially continuously throughout the length of the transfer line. Optionally, the transfer line may also include one or more flexible sections for making adjustments in source or load positioning, one or more fluid flow control valves, ell-sections and tee-sections to connect branch transfer lines.

The invention accordingly comprises the features of construction, combination of elements, and arrangement of parts which will be exemplified in the construction hereinafter set forth, and the scope of the invention will be indicated in the claims.

For a fuller understanding of the nature and objects of the invention, reference should be had to the following detailed description taken in connection with the accompanying drawings in which:

FIG. 1 is a diagrammatic representation of a helium transfer line for delivering liquid helium from a source to two different refrigeration loads and for returning liquid helium from the loads to the helium source showing an exemplary assembly and arrangement of the line components constructed in accordance with this invention;

FIG. 2 is a cross section of the basic transfer line of this invention taken normal to the direction of liquid helium flow;

FIG. 3 is a cross section of the basic transfer line of this invention taken along the direction of liquid helium flow;

FIG. 4 is a lengthwise cross sectional view of the female section of the heat-stationed bayonet connector used in the transfer line of this invention;

FIG. 5 is a lengthwise cross sectional view of the male section of the heat-stationed bayonet connector;

FIG. 7 is a cross section of the thermal conducting ring which may be used to join the bayonet connector sections when only one section of the bayonet connector is cooled;

Figure 16:
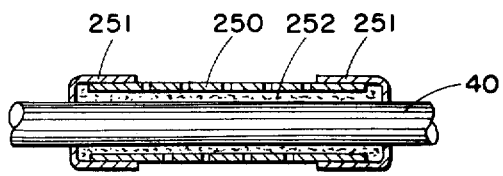
Figures 17, 18:
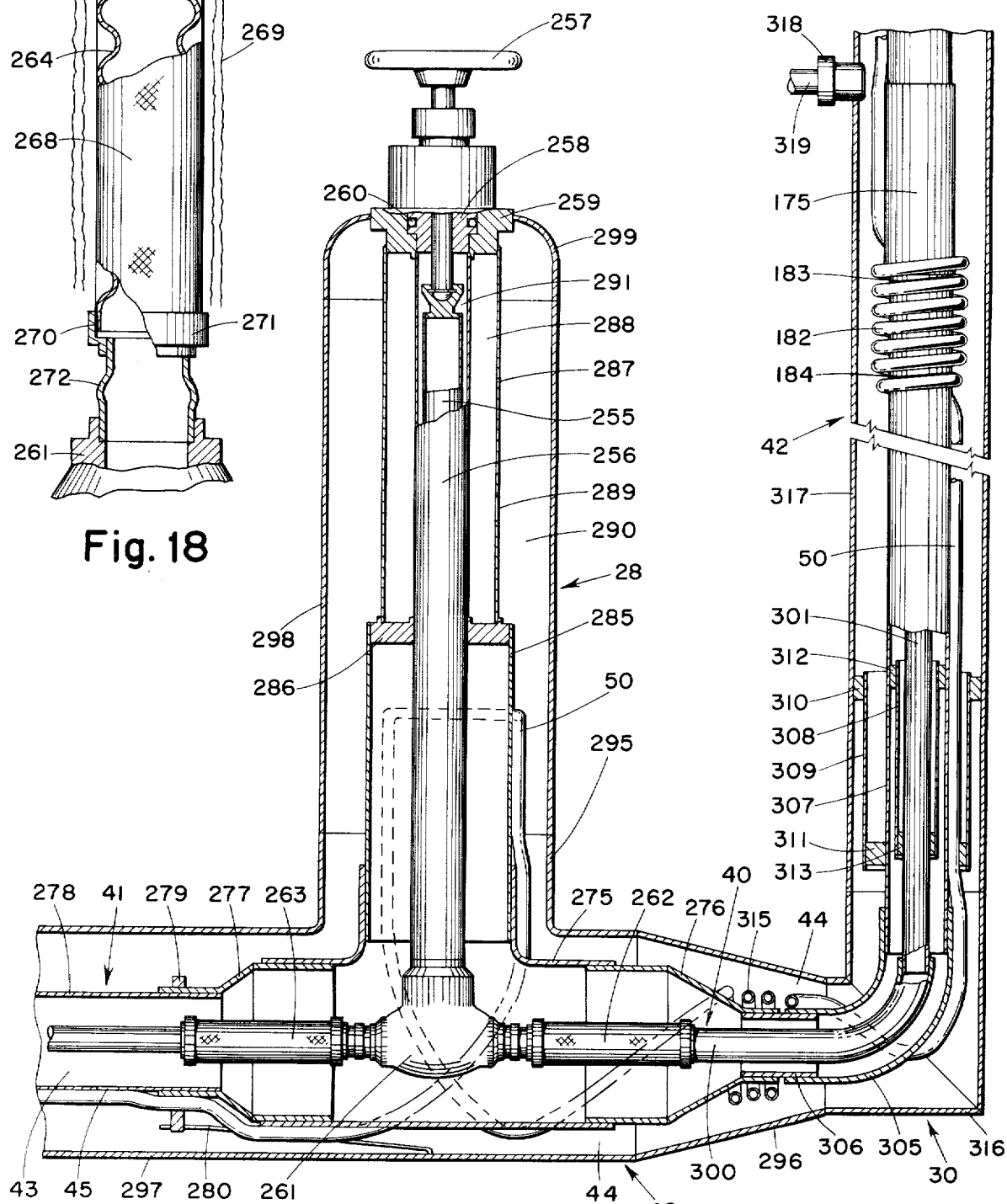
Figure 19:
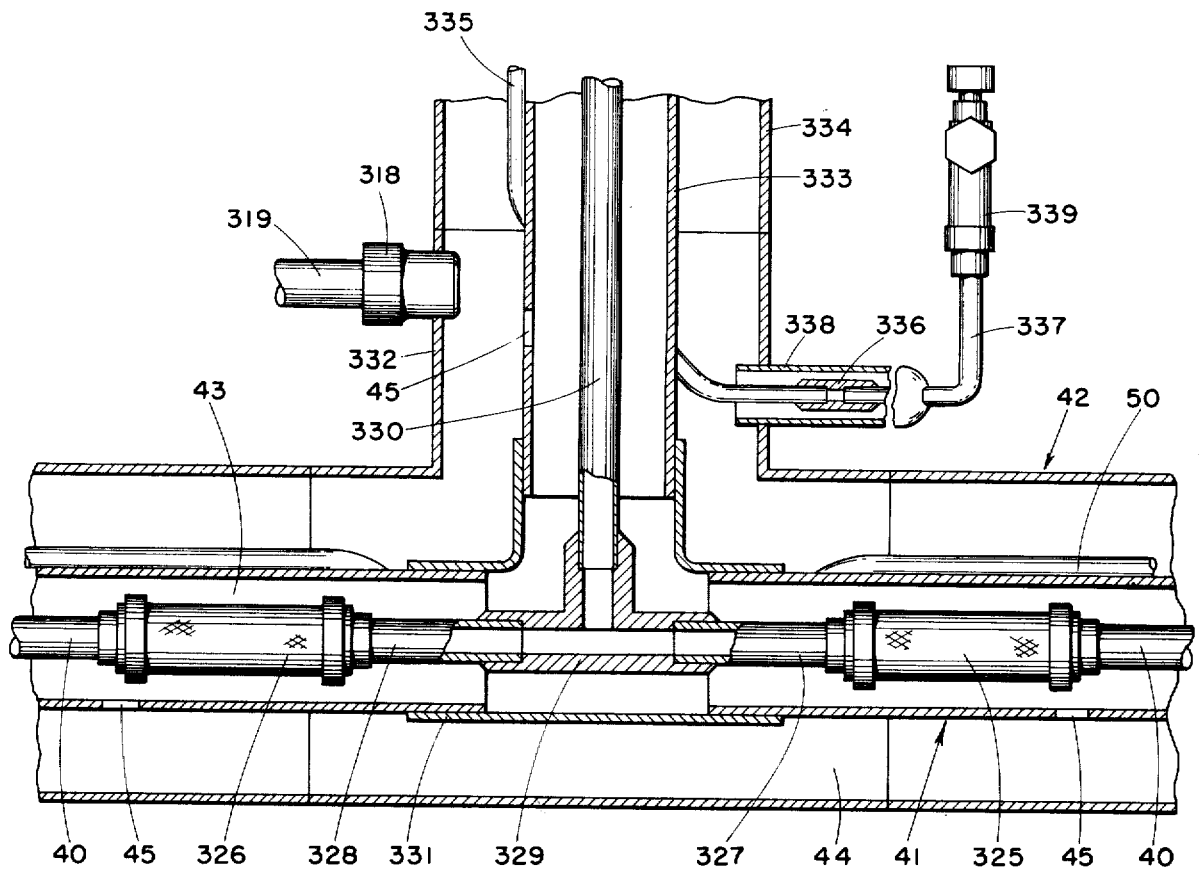

FIGS. 11 and 12 in combination constitute a cross sectional view of a flexible section used in conjunction with a removable bayonet;

FIGS. 13, 14 and 15 are cross sectional views taken through planes 13—13, 14—14 and 15—15, respectively, of FIG. 11;

FIG. 16 is a detailed cross sectional view of an adsorption unit;

FIG. 17 is a cross section of a portion of a transfer line showing the construction of an ell-section and the incorporation of a fluid flow control valve;

FIG. 18 is a detailed cross sectional view of an inner flex segment used with the valve; and FIG. 19 is a cross section showing the construction of a tee-section for connecting a branch transfer line.

The liquid helium transfer line diagrammed in FIG. 1 is to be viewed only as exemplary of the transfer line of this invention. It is illustrated to include all of the essential components of the line along with several optional additional components; and it shows the delivery of liquid helium to two refrigeration loads I and II which may be supplied alternatively or simultaneously with liquid helium refrigerant. It is, of course, within the scope of this invention to eliminate the second refrigeration load and the branch transfer line connecting it, or to use more than one branch line and direct the liquid helium refrigerant from a single source to more than two loads. It is also, of course within the scope of this invention to refrigerate one load with liquid helium delivered over more than one transfer line from one or more sources.

It will be seen that FIG. 1 illustrates a duplicate liquid helium return line inasmuch as the helium refrigerant will almost always be returned to a reservoir associated with the liquid helium source, and in the case where the liquid helium source is a helium liquefier, the returning helium (generally as cold, i.e., 4.2° K gas) will be returned through the heat exchanger of the liquefier. Thus it will usually be advantageous to return the cold gas through a transfer line which also achieves minimum heat leak and therefore a negligible rise in temperature.

As will be apparent from the following detailed decription of the components making up the transfer line, it will be possible for anyone skilled in the art to assemble a liquid helium transfer line according to the teaching of this invention to fit any situation requiring a refrigeration load to be connected to a liquid helium source using the various components in proper combination.

Since FIG. 1 includes all of the components it may be taken as an exemplary transfer line. The liquid helium source 20 may be a large liquid helium storage dewar or it may be a helium liquefier such as described, for example in U.S. Pat. Nos. 2,458,894, 2,966,035; 3,250,079 and 3,438,220. U.S. Pat. Nos. 3,250,079 will be taken as an example of one of these liquefiers in the description of the transfer line shown in FIG. 1. The supply transfer line 18 is connected to conduit 68 of FIG. 1 of U.S. Pat. No. 3,250,079 by means of the heat-stationed bayonet connector 21 which may have a liquid nitrogen ($LN_2$) bypass 22 associated with it as explained below. This heat-stationed bayonet is the subject of patent application Ser. No. 442,326 filed concurrently herewith in the names of Paul R. Doherty and Robert W. Johnson and assigned to the same assignee as this application. The heat-stationed bayonet and the $LN_2$ bypass are illustrated in detail in FIGS. 4–8.

In the case of transfer lines of extended length, e.g., more than about 25 feet it is necessary to place expansion/contraction joints 23 periodically along the line, for example about every twenty feet. As will be seen in FIGS. 9 and 10 which detail the expansion/contraction joint of this invention, the $LN_2$ line associated with the radiation shield is constructed to have a sufficient degree of flexibility to permit it to adjust to a change in length of the helium process line and the radiation shield.

If one or more branch lines are connected, this is done through a suitable tee-section 24, such as the one shown in cross section in FIG. 19. Before discussing those components which may be incorporated in a branch line, however, it will be convenient to complete the description of the direct transfer line.

In order to accommodate the refrigeration load 25 which may not always occupy the same position relative to the helium source or which may change from time to time, it may be necessary to make the bayonet connector 26, which forms the final connection with the line leading to the load, easily removable and adaptable to load locations. This may be done by including a flexible section 27 between removable bayonet 26 and the main transfer line. This flexible section which is illustrated in detail in FIGS. 11–15 gives maneuverability to the heat-stationed bayonet, allowing it to be engaged and disengaged at will.

With the optional use of a branch line it is generally necessary to provide a valve 28 to control the flow of liquid helium through the branch line. It is, of course, also within the scope of this invention to use a valve in the main transfer line if this is required. Because the valve 28 requires elements which will be positioned normal to the direction of liquid helium flow and since at least some of these elements are maintained near liquid helium temperature, it is necessary to provide a section of the line with the capability of taking an offset in that direction (normally vertical) which is normal to the direction of liquid helium flow. This is done by using what are termed inner flex sections 29 on either side of the valve 28. A valve and its associated inner flex sections are detailed in FIGS. 17 and 18.

The use of an ell-section 30 may be convenienent to accommodate certain spaces; and when one or more of these optional components is used, the ell-section must be constructed to provide a liquid helium line and radiation shielding capable of remaining so positioned within the section during periodic expansion and contraction such that no thermal shorting occurs. Such an ell-section is illustrated in detail in FIG. 17. The incorporation of a branch line will require a tee-section as detailed in FIG. 19.

The flow of the LN$_2$ coolant from LN$_2$ sources 35 along the transfer line to nitrogen reservoirs 36 is shown by dotted lines in FIG. 1. It is within the scope of this invention to locate these LN$_2$ sources and nitrogen reservoirs at predetermined points along the transfer line, the primary consideration in choosing their locations being that of providing sufficient liquid nitrogen so that most of it remains in the liquid state during its use in cooling the radiation shielding. This is desirable because it is much easier to move liquid nitrogen than gaseous nitrogen, the latter requiring some suitable pumping means. The relatively high latent heat of vaporization of liquid nitrogen (5600 joules per mole at 77.3° K) makes it ideally suited for this purpose. Although FIG. 1 shows the LN$_2$ coolant moving in a direction from the refrigeration load to the liquid helium source 20, the flow may just as well be in the opposite direction.

The transfer line used to return the 4.2° K helium gas from the refrigeration load to a liquefier/refrigerator is shown in FIG. 1 to be a duplicate of the transfer line carrying the liquid helium to the load. Therefore, the components have been identified by the same reference numerals, with a prime marking added, used in identifying them for the liquid helium delivery line. In all cases, the same construction is used for the corresponding components, i.e., bayonet connector 21 is identical to bayonet connector 21', etc.

When a liquid helium source such as the helium liquefier of U.S. Pat. No. 3,250,079 is used, the return transfer line 19 is joined through bayonet connector 21' to the cold low-pressure side of the main liquefier heat exchanger, i.e., to conduit 72 of FIG. 1 of U.S. Pat. No. 3,250,079.

The basic construction of the transfer line of this invention is illustrated in the two cross sectional views of FIGS. 2 and 3. An inner tubing 40, formed preferably of an austenitic-type stainless steel, carries the liquid helium and will be referred to for convenience as the "liquid helium process line." Concentric with tubing 40 and spaced therefrom is a copper tubing 41 which serves as the radiation shielding means. A third tubing 42 concentric with tubings 40 and 41, surrounding them and spaced from tubing 41 serves as the vacuum jacketing means. The annular spacing 43 defined between tubings 40 and 41 and the annular spacing 44 defined between tubings 41 and 42 are evacuated, these spacings 43 and 44 being periodically connected through gas passages 45 cut in radiation shielding means 41. Multilayer insulations 48 and 49 each in the form of several layers of an aluminized plastic film (e.g., an ethylene glycol terephthalate polymer) shaped into tubular form are located in spacings 43 and 44. Throughout the remaining drawings this insulation will be omitted for clarity of presentation. It is to be understood, however, that this insulation is always present. As seen in FIG. 3, spacing 44 is connected to a vacuum pumping system (not shown) by way of an evacuation line 46 through a seal-off valve 47. A plurality of these connections to a suitable vacuum system are made along the line. A copper tubing 50 is bonded for thermal contact with the outer surface of radiation shielding means 41 and it serves as the LN$_2$ line designed to carry the liquid nitrogen for cooling the radiation shielding. This line will, for convenience, be referred to hereinafter as the "LN$_2$ line." It is, however, within the scope of this invention to use any other suitable cryogenic liquid coolant so that line 50 is more generally defined as a cryogenic coolant line.

It will be seen in the following detailed description of the various components which are incorporated into this basic transfer line structure, that the elements making up this structure are always present, although they may be in a somewhat modified form to accommodate some specific need at various points of connection and within various components. Thus, with the exception of the bayonet connector, the same reference numerals will be used throughout to identify the liquid helium process line, the radiation shielding means, the vacuum jacketing means, evacuated spacings and LN$_2$ line in order clearly to indicate how these components are integrated into a transfer line, whether it is a liquid helium delivery or return line.

Figure 8:
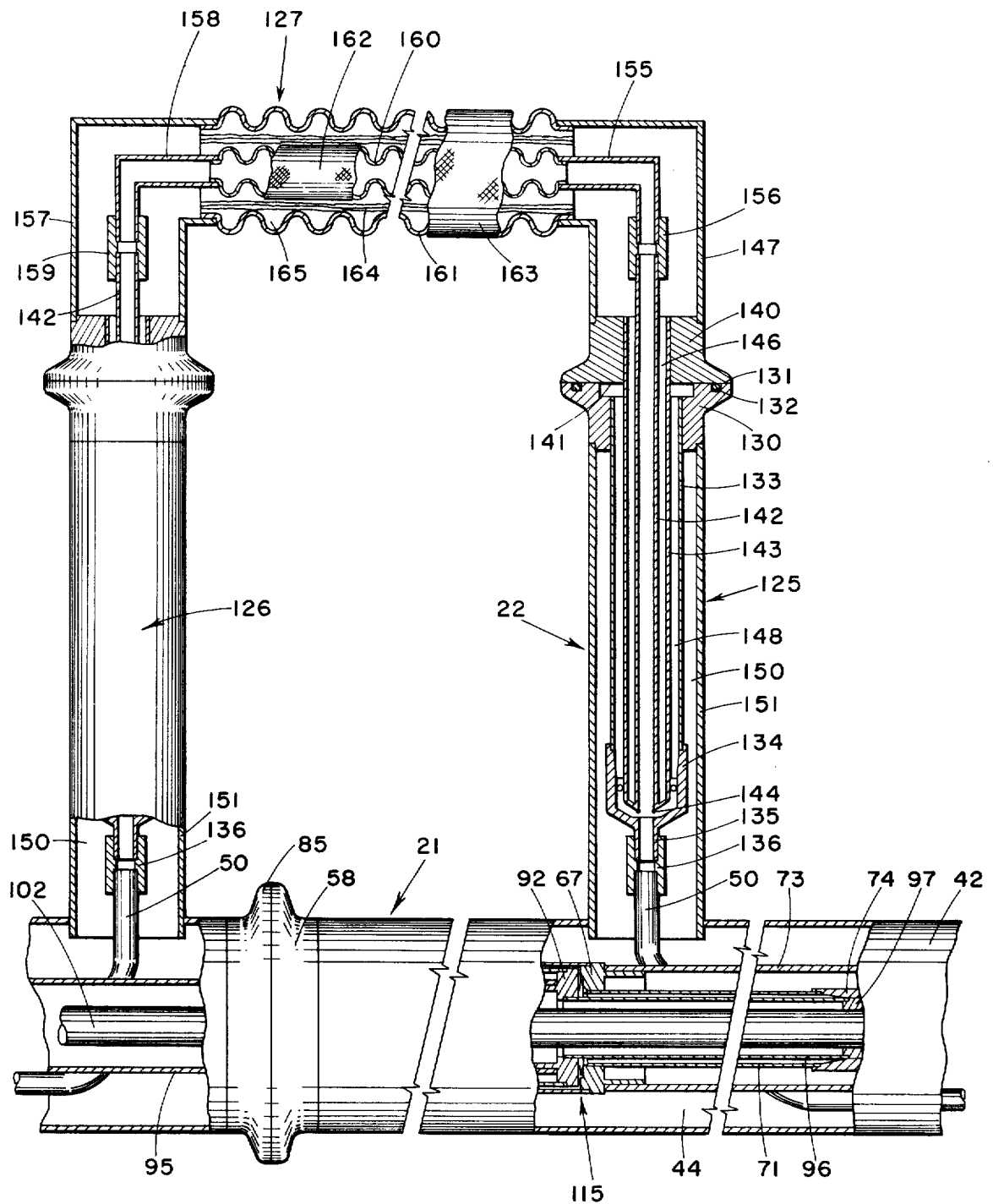
FIG. 8 is a cross sectional view of a liquid nitrogen bypass attached to the fully engaged heat-stationed bayonet connector.

FIGS. 4–7 show the heat-stationed bayonet connector in detail; and FIG. 8 illustrates the LN$_2$ bypass line and its connection to the heat-stationed bayonet connector.

The transfer line of this invention is connected to the liquid helium source and to the refrigeration load through a heat-stationed bayonet connector. This bayonet connector is also used to connect other components into the line.

Bayonet connectors are known in the art. However, in these prior art connectors, each section is formed as one continuous tube extending continuously from a room temperature station down to the cold seal. This large temperature difference over a relatively short distance results in a conductive heat leak along the metallic tubes which in many applications is quite significant. The heat leak thus set up can be reduced, but not eliminated, by increasing the length of the bayonet. However, there are practical limitations on the bayonet's length, limitations which affect the efficiency of this type of connector when constructed according to the prior art teaching.

The heat-stationed bayonet used in the transfer line of this invention is constructed so that it is possible to intercept the transfer of heat along the length of the assembled bayonet. This interception is effected along both the male and female sections by the inclusion of heat stations which are cooled through radiation shields in the two sections. The radiation shields are in turn cooled by liquid nitrogen (or other suitable cryogenic coolant) which is shunted around a portion of the heat-stationed bayonet through an $LN_2$ bypass to allow the bayonet sections to be engaged and disengaged. The use of such an $LN_2$ bypass means that both sections of the bayonet connector may be cooled separately. However, the heat stations of the two bayonet sections may be placed in indirect thermal contact through the use of a thermal conducting ring, in which case it will be necessary to cool the radiation shielding of only one of the sections, the radiation shielding of the other section being cooled through this connection of heat stations.

Figure 6:
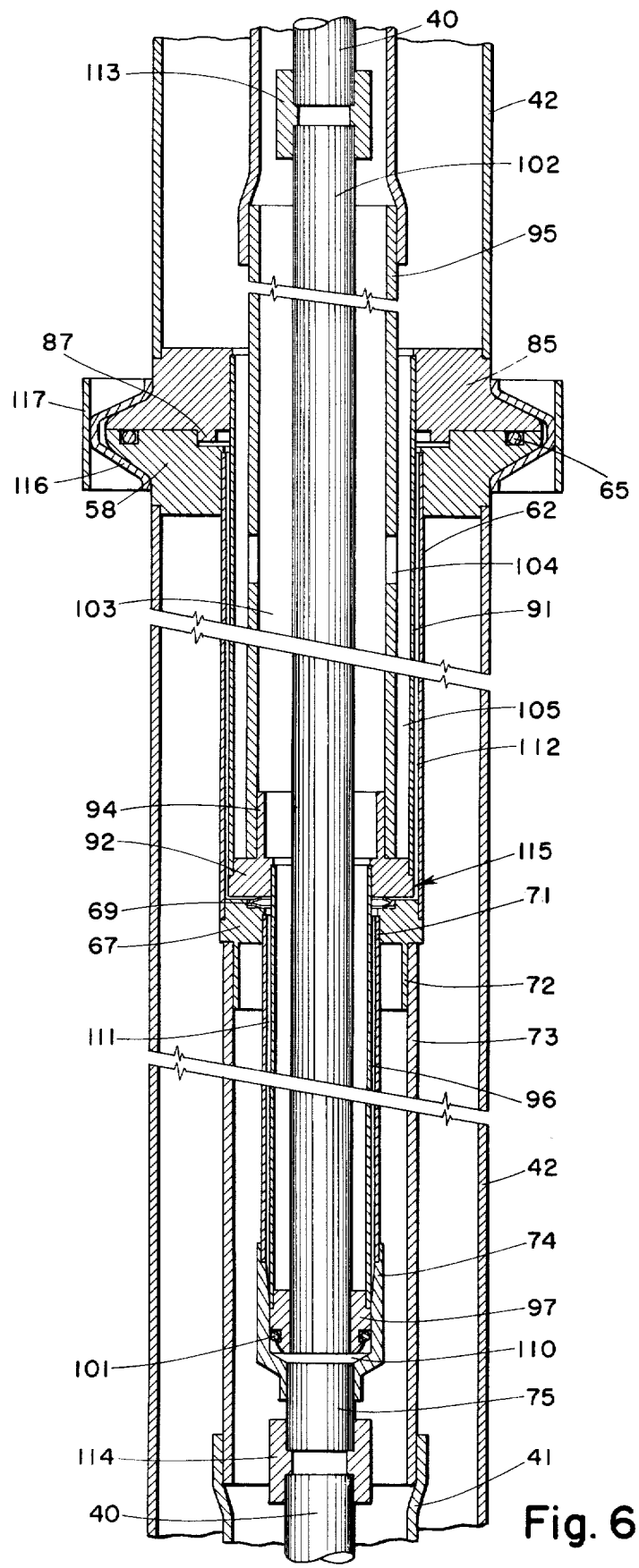
FIG. 6 is a lengthwise cross sectional view of the assembled bayonet connector with the sections fully engaged showing the use of a thermal conducting ring joining heat stations in each section.

The construction of the two bayonet sections is shown in detail in FIGS. 4 and 5; and the assembled bayonet is shown in FIG. 6. The attachment of the $LN_2$ bypass is illustrated in FIG. 8.

FIG. 4 is a longitudinal cross section through the center of the female section of the bayonet connector. This section is formed of a mating flange 58 constructed to have a central passage 59 with an inwardly directed rim 60 terminating in a narrow lip 61 serving as a seat for thin-walled extension tube 62 formed of a low heat conductive material such as stainless steel. Tube 62 is sized and constructed to reduce the heat leak to the heat station. Flange 58 has an outer annular recess 63 in its mating surface 64 to seat an elastomeric sealing ring 65 and a peirpheral shoulder 66 to seat a vacuum jacket (shown in FIG. 6). Tube 62 terminates in an annular heat station 67 configured to define a rim seat 68 to seat a compressible thermal conducting ring 69 shown in expanded form in cross sectional detail in FIG. 7. This thermal conducting ring comprises an annular ring with an angled cross section. Heat station 67 is also configured to provide an inwardly directed lip 70 adapted to seat a thin-walled, stainless steel extension tube 71, and a transition piece 72, in the form of a skirt, used to connect copper tubing 73, which serves as the radiation shielding associated with the female section, to heat station 67. Radiation shielding 73 extends for the remaining length of the bayonet connector and it is adapted for connection to the radiation shielding of the transfer line.

Inner extension tube 71 ends within a mating seat 74 welded on one end to inner tube 71 and on the other end to a short tubing section 75 adapted to be coupled to the liquid helium process line. Internally, mating seat 74 (from its connection with tube 71 to its connection with tubing section 75) has a slightly decreasing-diameter section 76, a constant-diameter section 77 and a short sharply decreasing-diameter section 78. A series of ports 79 provide fluid communication between spacing 80 defined between tubes 71 and 73 so that when the volume around tube 73 is evacuated spacing 80 will also be evacuated. Multilayer insulation 81 is located in spacing 80, only a fragment being shown.

The male section of the heat stationed bayonet connector is shown in FIG. 5. It will be seen to have a mating flange 85 with mating surface 86, adapted to engage surface 64 of the female section, and a short annular ring extension 87 of this mating surface is adapted to fit snugly against the outer wall the larger diameter section of central passage 60 of the female section. Flange 85 has a peripheral shoulder 88 adapted to seat a vacuum jacket. Seated onto lip 89, extending inwardly into flange central passage 90, is a thin-walled stainless steel extension tube 91 which is connected to an annular heat station 92 configured to provide an internal lip 93 and a transition piece 94 in the form of a skirt. Radiation shielding 95 formed as a copper tube is bonded for thermal connection to transition piece 94, and this radiation sheilding extends through tubing 91 and beyond mating flange 85. An inner thin-walled stainless steel extension tube 96 extends from heat station 92 to an annular nose piece 97 shaped to have an external surface which defines a shoulder 98 for seating tube 96, a constant-diameter section 99 and a decreasing-diameter section 100, the latter having an annular groove cut in it to seat an elastomertic o-ring seal 101. A liquid process line 102, formed perferably of an austenitic stainless steel, extends from nose piece 97 through tube 96, and through and beyond radiation shield 95. The annular space 103 defined between the external wall of process line 102 and the internal wall of radiation shielding 95 is in fluid communication through a series of ports 104 with the annular space 105 defined between radiation shielding 95 and outer tubing 91. When a vacuum jacket is affixed to flange 85, both spacings 103 and 105 are evacuated. Multilayer insulation 106, shown only fragmentarily, is located in spacings 103 and 105.

In FIG. 6, in which the elements forming the female and male sections are identified by the same reference numerals used in FIGS. 4 and 5, the heat-stationed bayonet connector is shown in complete engagement. With the full insertion of the male section into the female section, mating surfaces 64 and 86 engage, and o-ring seal 65 contacts surface 86 to form a fluid-tight seal. Heat station 67 of the female section makes indirect contact with heat station 92 of the male section through thermal conducting ring 69 which is compressed between the two heat stations.

This thermal conducting ring may be omitted in those cases where radiation shielding 73 associated with the female section and radiation shielding 95 associated with the male section are each cooled separately. In such cases, the indirect thermal contact between heat stations 67 and 92, through thermal conducting ring 69, is not necessary. However, in those cases where the radiation shielding of only one section (either male or female) of the bayonet connector is cooled directly through and $LN_2$ line or by other suitable means, then thermal conducting ring 69 is used so that the radiation shielding of the other section is cooled indirectly. For example, where the bayonet is used to make a connection between the transfer line and the refrigeration load and the radiation shielding of one section (e.g., female section) of the bayonet is thermally connected to a cooled radiation shielding associated with the load, then by using thermal conducting ring 69 between heat stations 67 and 92 it will be unnecessary to provide cooling for radiation shielding of the other section (e.g., male section).

When the sections are engaged as shown in FIG. 6, the o-ring seal 101 in nose piece 96 at the end of the male section forms a liquid-tight, cold seal with the internal wall of constant-diameter section 77 of mating seat 74 of the female section. It will be seen that so long as o-ring 101 engages the internal wall of constant-diameter section 77 of mating seat 74 a liquid-tight seal will be formed. This provides a degree of tolerance in the length of tube 96 relative to tube 71. The short tubing section 75 of the female section, serving as a portion of a liquid process line, is in fluid communication with the process line 102 of the male section through the small chamber 110 defined within the mating seat and limited by the line of engagement of the internal wall of mating seat 74 and o-ring 101.

One narrow annular space 111 is defined between tubes 96 and 71 and another annular space 112 is defined between tubes 91 and 62. These spaces are of sufficient width to make an easy slide fit between the respective tubes defining them, and space 111 must also provide for room to deform o-ring 101 to form a liquidtight seal.

FIG. 6 also illustrates the incorporation of the heat-stationed bayonet connector into a liquid helium process line 40. Thus the fluid process line 102 extending thoughout the length of the male section of bayonet is coupled to main liquid helium process line 40 by a union socket 113, typically formed of an austenitic stainless steel. The radiation shielding means 41 of the transfer line is shaped for making a bonded connection over the end of radiation shield 95 of the male section. In a similar manner the short tubing section 75 of the female section is joined through union socket 114 to process line 40 and radiation shield 73 is joined to radiation shielding 41. Sections of vacuum jacketing 42 are fit on to mating flanges 58 and 85 at peripheral shoulders 66 and 88, respectively.

The two sections of the bayonet connector are retained in their engaged position by means of a clamp member comprising a series of grippers 116 held by a cricular band 117 which is tightened around the grippers by a nut and bolt (not shown).

As will be evident from FIGS. 4-6, the heat-stationed bayonet of this invention may be described as being formed, in addition to a process line, of radiation shielding means (comprising a first radiation shield 73 associated with the female section and a second radiation shield 95 associated with the male section) intersected by heat transfer means 115 (comprising heat stations 67 of the female section and 92 of the male section along with thermal connecting ring 69 if used) and a series of concentic thin-walled extension tubes of low heat conductivity (62, 71, 91 and 96) defining annular spacing on either side of the heat station means and providing with minimum heat leak the necessary structure to support the heat station means and the nose piece and its mating seat forming a liquid seal. The radiation shielding means is adapted for connection to the radiation shielding of the transfer line, of a line leading from the fluid cryogen source or of various components in the line; and the process line is adapted for connection to the process line of the transfer line system and/or the process line of the cryogenic fluid source or of the refrigeration load.

As pointed out previously, the bayonet connector used in the transfer line of this invention is designed to intercept the flow of heat along its length by the use of heat station means which may in effect be a combination of heat station 67 of the female section and heat station 92 of the male section. As explained in the description of FIG. 6, these two heat stations may be in indirect thermal contact through thermal conducting ring 69, if it is used. The combined heat station means, designated by reference numeral 115, is also in thermal contact with radiation shield 73 through transition piece 72 and with radiation shield 95 through transition piece 94. By cooling radiation shields 73 and 94 through the use of liquid nitrogen circulating in the $LN_2$ line bonded in thermal contact therewith or by cooling one or the other of radiation shields 73 and 94 alone and incorporating thermal conducting ring 69, the heat station means 115 is cooled to essentially liquid nitrogen temperature, thus serving as an effective means for intercepting any heat leak along the length of the bayonet. As an alternative to the use of liquid nitrogen, cold helium gas may be used as a radiation shielding coolant. Thus the heat-stationed bayonet may be relatively short compared to prior art bayonets designed for minimun heat leak. It is, moreover, more efficient than prior art bayonets in that it reduces liquid helium losses to a level heretofore not attainable in connectors of this type. Finally, and very importantly, the heat-stationed bayonet connector is adapted for use in the transfer line of this invention which incorporates an $LN_2$-cooled radiation shield protecting essentially its entire length.

Since the bayonet is a connector and must be disengageable, it is not possible to associate an $LN_2$ line along its entire length. In the transfer line of this invention, a flexible $LN_2$ bypass line is used in connection with each heatstationed bayonet to join the $LN_2$ line associated with the radiation shields on each side of heat station means 115. The bypass line and its attachment to the bayonet are shown in FIG. 8.

As will be seen in FIG. 8, the $LN_2$ line 50 breaks contact with bayonet radiation shield 73 just short of heat station means 115 and rejoins bayonet radiation shield 95 just beyong mating flange 85 shown without the clamping member of FIG. 6. The $LN_2$ bypass connects the two ends of $LN_2$ line 50 at these points. The bypass is comprised of two bayonet connectors 125 and 126, constructed in accordance with the prior art teaching, and a flexible insulated section 127 between bayonets 125 and 126.

The construction of bayonet 125 is shown in FIG. 8. Bayonet 126 is an exact duplicate of 125 and need not be described. The female section of bayonet 125 is comprised of a mating flange 130 having a mating surface 131 which is grooved to seat an o-ring seal 132. Extending from the central opening of flange 130 is a tube 133 which terminates in a mating seat 134 having an $LN_2$ line extension 135 suitable for joining to $LN_2$ line 50 through a union socket 136. The male section of bayonit 125 comprises mating flange 140 with mating surface 141, and concentric inner tube 142 and outer tube 143 which are welded at the cold end at 144. Mating flanges 130 and 140 are maintained in engagement by a clamp member (not shown) similar to the clamp member shown in FIG. 6. Inner tube 142 which is the $LN_2$ transfer line extends beyond flange 140 for easy connection. Spacing 146 defined between tubes 142 and 143 is open at the warm end for communication with an evacuated volume defined within vacuum jacket 147 which is elbow shaped. Spacing 148 is defined between tubes 143 and 133 and serves as insulation; while spacing 150, which is defined between tube 133 and a vacuum jacket 151 extending from the female section mating flange 130 through the transfer line vacuum jacketing 42, is evacuated by virture of its connection with the evacuated main transfer line.

LN₂ transfer line 142 of the bayonet is joined to an elbow section 155 of LN₂ transfer line through a union socket 156. Connected to bayonet 126 is an allochiral arrangement of the elements attached to bayonet 125, comprising elbow shaped vacuum jacket 157, an elbow section 158 of the LN₂ line, and coupling 159 joining the transfer line 142 of bayonet 126 to section 158. Between these two facing elbow sections is flexible section 127 comprising an inner bellows 160 joining LN₂ line sections 155 and 158, and outer bellows 161 joining vacuum jackets 147 and 157. Protective wire screenings 162 and 163 are placed around inner bellows 160 and outer bellows 161, respectively. Multilayer, insulation 164, such as several layers of a crinkled aluminized plastic film formed of an ethylene glycol terephthalate polymer, is placed in the evacuated spacing 165 defined between bellows 160 and 161.

It will be seen from FIG. 8 that the evacuated spacing around the bayonet connector is not in fluid communication with the evacuated spaces defined within bayonets 125 and 126 and flexible connection 127. It is therefore necessary to provide separate means such as a seal-off valve and line to a vacuum pump (not shown) for evacuating the bypass line. The female section of bayonet 125 is in effect connected to female section of heat-stationed bayonet 21; while the female section of bayonet 126 is connected to the male section of the heat-stationed bayonet. This connection makes it possible to provide the required refrigeration through the LN₂ line to the radiation shields and heat station means of the heat-stationed bayonet. In such an arrangement it is not necessary to use a thermal conducting ring in the heat station means of the bayonet connector 21. Although FIG. 1 illustrates an LN₂ bypass associated with bayonets 21 and 26, it is possible that it may not be required for one or both of these bayonet connectors if the radiation shielding of one section of the connector is in thermal contact with a cold radiation shielding associated with a line leading from or to the liquid helium source or the refrigeration load, provided a thermal conducting ring is used to effect the indirect thermal connecting of the heat stations in the two bayonet sections when they are engaged.

The flexible section 127 of the LN₂ bypass makes it easy to disengage bayonets 125 and 126 as well as to disengage the sections of the heat-stationed bayonet 21. The flexible section also provides accommodation for misalignment and/or slight offset of the mating portions of the bayonet. This arrangement of the LN₂ bypass with the heat-stationed bayonet is one of the primary features which makes it possible to use a cryogenically cooled radiation shield in the transfer line of this invention.

When long lengths of transfer lines are used, there arises the very serious problem of contraction of the line elements with cooling and subsequent expansion when the elements are brought back to room temperature. In the transfer line of this invention this problem is solved by periodic placement of unique expansion/contraction joints which incorporate both the radiation shielding means and the LN₂ line, thus making it possible to achieve one of the principal objects of this invention, namely the construction of a liquid helium transfer line shielded throughout its entire length by liquid nitrogen-cooled radiation shielding means.

Figure 9:
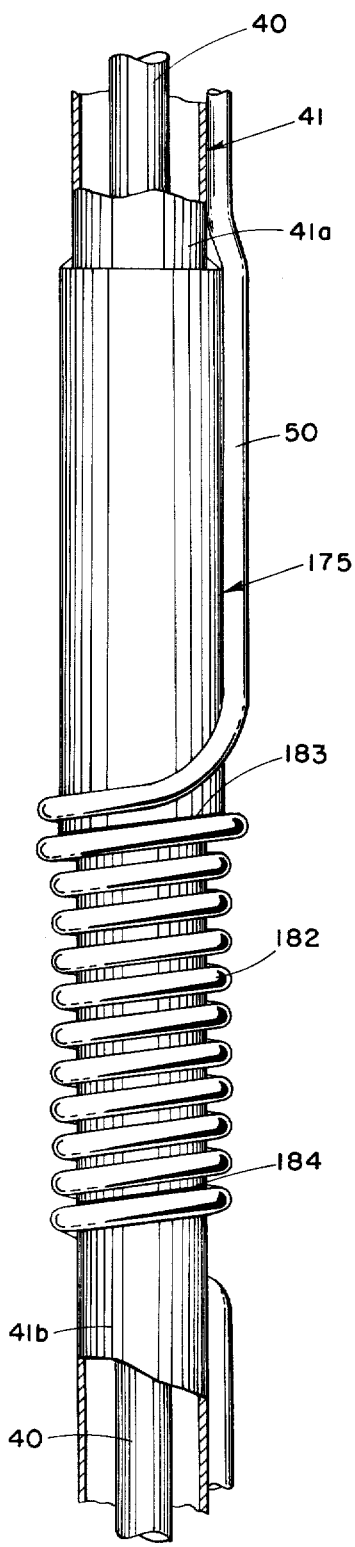
FIG. 9 is a side elevational view of an expansion/contraction joint.
Figure 10:
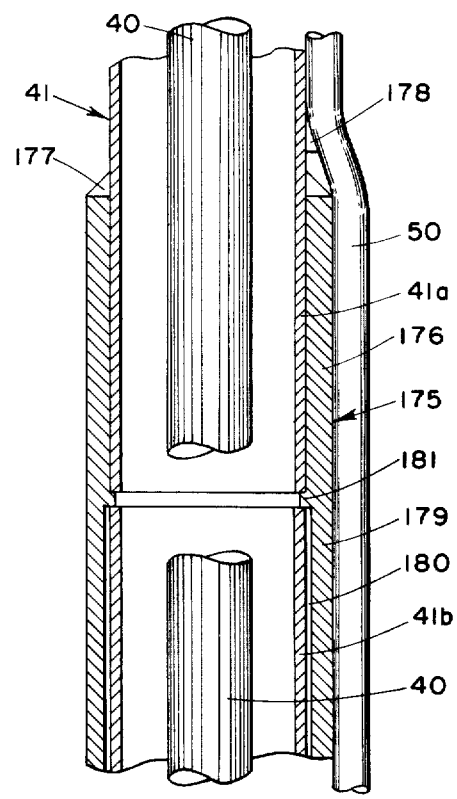
FIG. 10 is a cross sectional detail of the expansion/contraction joint of FIG. 9 taken along the axis of the transfer line.

This unique expansion/contraction joint is shown in FIGS. 9 and 10, FIG. 9 being primarily a side elevational view and FIG. 10 being a partial cross sectional view showing the locale of the radiation shield movement with change in temperature. In forming the expansion/contraction joint, the radiation shielding is cut to form two abutting sections, designated 41a and 41b in FIGS. 9 and 10. At the juncture of the two sections of the radiation shielding means, a copper coupling 175 in the form of a sleeve is placed around the ends of the radiation shielding. As shown in FIG. 10, the internal wall of coupling 175 is configured to have a first section 176 with an internal diameter of a dimension to make a snug fit with the external surface of radiation shielding section 41a which is brazed to coupling 175 directly at several points such as at 177 and indirectly such as at point 178 where the LN₂ line, which is in turn brazed to coupling 175, is brazed to radiation shielding section 41a. The internal wall of coupling 175 is configured to have a second section 179 having a diameter of such a dimension as to define a narrow spacing 180 between it and the external wall of radiation shielding section 41b. A short, inwardly extending lip 181 joins sections 176 and 179 of the coupling and serves as a guide for locating radiation shielding section 41b for room temperature assembly and as a stop for the axial motion of section 41b.

Since the LN₂ line must be continuous across the expansion/contraction joint, a section of it is wound as a coil 182 to give to the LN₂ line the capability of axial expansion and contraction. As noted above, the LN₂ line is attached to coupling 175, and this is done by brazing a section of LN₂ coil 182 at 183 where the coil extends around the end of the coupling. The other end of coil 182 is brazed at 184 to the movable section 41b of the radiation shield. Therefore, as radiation shield section 41b experiences axial motion within the coupling (as indicated by the arrows and dotted line position of FIG. 10), the LN₂ coils act as a spring and move with it.

By placing expansion/contraction joints of this type in the transfer line wherever required the line may be extended as desired.

In order to impart a degree of flexibility in the attachment of the transfer line to the refrigeration load, a so-called "flexible section" component is incorporated into the transfer line. In FIG. 1 this is shown to be used in connection with a so-called "removable bayonet" which terminates the transfer line at the point of the refrigeration load. In actual practice, all bayonets are in fact disengageable; however, the final heat-stationed bayonet used to make the connection between the transfer line and a line associated with the refrigeration load must be removable in the sense that it can break contact with the load line and can further be moved into various positions. By combining the flexible section illustrated in detail in FIGS. 11–15 with the bayonet of FIG. 8 (with or without an LN₂ bypass) and by connecting the flexible section with the main transfer line through another heat-stationed bayonet with an LN₂ bypass, the desired degree of flexibility in attaching the transfer line to the load is attained.

The flexible section of the transfer line of this invention is shown in cross section in FIGS. 11 and 12 which must be viewed in combination to represent a single flexible section. Generally, that portion of the flexible section shown in FIG. 12 will be rotated 90° from the position illustrated. It is, however, more convenient and more easily visualized to illustrate it in the manner used in FIGS. 11 and 12.

Flexibility in this flexible section is derived from the relative positions of the two rigid ell-segments generally designated 190 and 191, as well as from the flexible midsegment 192 which permits axial and some twisting motion. One ell-segment, i.e., that shown in FIG. 11, is connected to the refrigeration load through a heat stationed-bayonet 26 such as shown in detail in FIG. 6, the elements of which are shown in FIG. 11 being identified by the same reference numerals used in FIG. 6. This heat stationed-bayonet of FIG. 11 may have an $LN_2$ bypass identical to that illustrated in FIG. 8 as indicated by a partial showing of bayonet 126 and the connection to $LN_2$ line 50. However, as previously noted the $LN_2$ bypass may be omitted. The other ell-segment, i.e., that shown in FIG. 12, is connected in a similar manner to the transfer line through another heat stationed-bayonet 26 having a $LN_2$ bypass 22.

In constructing an ell-segment such as used here where an essentially continuous, liquid nitrogen-cooled radiation shielding is used, it is necessary to provide for axial movement of the tubings making up to two arms 193 and 194 of the lines which are oriented perpendicularly to each other as well as to ensure that these tubings remain out of contact to prevent thermal shorting during such axial motion. This arrangement must, of course, be achieved with minimum heat leak.

In describing the flexible segment of FIGS. 11 and 12 it will be convenient to detail each tubing system, working from the center outwardly. The same reference numerals will be used in both FIG. 11 and FIG. 12 and since the same arrangement obtains in both of these parts of the flexible section, it will be necessary only to describe FIG. 11 in detail.

An elbow-segment 200 of liquid helium process line 40 is coupled to process line 102 of the male section of heat-stationed bayonet 26 by means of union socket 113. This elbow segment 200 is in turn, coupled through union socket 201 to a straight segment 202. This segment 202 is welded to an adapter coupling 203 which joins it to process line bellows segment 204 brazed to the internal surface of the adapter coupling at 205. Bellows 204, forming a flexible process line, are protected and strengthened by being enclosed by wire cloth 206.

The radiation shielding 95, which is part of the male section of heat stationed-bayonet 26, is coupled through an adapter coupling 210 to a straight segment 211 of radiation shielding 41 positioned in arm 193. A comparable straight segment 212 of the radiation shelding in arm 194 is connected to segment 211 through an elbow segment 213, the latter being configured on its ends to fit over the ends of segments 211 and 212. The concentricity of the helium process line is maintained by the use of spacers 214 and 215, spacer 214 which is typical being shown in the cross section of FIG. 13. Spacers 214 and 215 are spot welded to straight segment 211 and eblow segment 200, respectively, and are shaped to make at least 3 point contacts with the internal wall of the radiation shielding.

In the elbow section the radiation shielding means are prevented from contacting the liquid helium process line during contraction and expansion and are therefore prevented from causing a thermal short circuit which would result from such contact. This is accomplished through the use of a series of concentric stainless steel spacer tubings and spacer means. Thus smaller-diameter spacer tubing 220 formed of stainless steel is located within radiation shielding section 212 and larger-diameter spacer tubing 221, also formed of stainless steel, is placed around radiation shielding 212. A series of spacer means is used between these concentric tubings and they are bonded to the vacuum jacketing and to all of the tubings which they contact except the helium process line segment 202.

The cross sections of the spacer means in FIGS. 14 and 15 illustrate two embodiments of this component. In FIG. 14 the spacer means is shown as a solid ring 222; while in FIG. 15 it is shown as a series of spacers 223 joined through a connector ring 227. One of the spacers 223 has a passage 226 drilled through it to permit $LN_2$ line 50 to pass through it (see FIG. 15).

The $LN_2$ line 50 is wrapped around and bonded to radiation shielding 212, passes through opening 226 in spacer 223 and then is wrapped to form a coil segment 230 which extends throughout the length of flexible segment 192. Multilayer insulation 231 is positioned between wire cloth 204 and the inside of coil segment 230 of the $LN_2$ line. This insulation typically comprises several layers of a crinkled aluminized plastic film, e.g., an ethylene glycol terephthalate sold for example under the tradename MYLAR.

In similar manner the vacuum jacketing means, generally designated by the reference numeral 42, is formed in segments including a reducing segment 235, an elbow segment 236, and a coupling 237. Throughout the length of the flexible segment 192, the vacuum jacketing, like the helium process line, takes the form of stainless steel bellows 238 welded at 239 to coupling 237; and like process line bellows segment 204, vacuum jacketing bellows segment 238 is protected and strengthened by a wire cloth covering 240. Multilayer insulation 241 is interposed between $LN_2$ line coil 230 and the inner wall of vacuum jacketing bellows 238. Thus in the flexible segment 192 the liquid nitrogen cooled multilayer insulation 231 and 241, which is flexible, serves also as a form of radiation shielding means.

By the use of the spacer means and spacer tubings 220 and 221, the radiation shield segment 212 and the vacuum jacketing are all maintained in desired relative positions while the process line segment 202 may expand and contract relative to the radiation shielding. This, then, makes it possible to introduce cold helium into the process line and liquid nitrogen into the $LN_2$ transfer line in any desired order without facing the possibility of thermal shorting. For example, it may be desired to use the process line without using $LN_2$ cooling, or to cool the radiation shield prior to the introduction of liquid helium into the process line. The arrangement of these spacer elements thus imparts flexibility of operation.

The use of the thin-walled spacer tubings formed of a low heat conductivity metal minimizes the heat leak along radiation shield segment 212 due to the differences in temperatures between spacers 222 and 223 and between spacers 224 and 225. The coiling of the $LN_2$ line provides for expansion and contraction as well as flexibility of that component.

The maximum degree of flexibility is to be realized when the flexible section has the two elbow segments as shown in FIGS. 11 and 12. However, it is also within the scope of this invention to construct a flexible section using but one elbow section, e.g., by eliminating elbow segment 191 of FIG. 12 and continuing helium process line 200 and radiation shielding segment 213 as straight segments beyond spacers 222. The connection with heat-stationed bayonet 26 of FIG. 12 would remain as shown.

Although FIG. 1 shows a flexible section associated with the heat stationed bayonet connector which terminates the transfer line at the refrigeration load, it is also within the scope of this invention to use a flexible section in association with the heat-stationed bayonet which terminates the transfer line at the liquid helium source. Moreover, since the flexible section itself terminates at each end in a heat-stationed bayonet, it is possible to readily remove or install such a section in the line.

Evacuation of the volume defined within the helium transfer line surrounding the liquid helium process line is, of course, used to prevent heat leaks into the process line through conduction. Generally, vacuums in the range of about twenty torr can be achieved by the use of a vacuum pump to evacuate this volume. Once evacuation is acieved in this manner, the line is sealed off through one or more seal-off valves such as shown in FIGS. 17 and 19. Thereafter, the vacuum in the transfer line is reduced to about $10^{-5}$ torr through cryopumping, i.e., the condensing of the condensible gases on the outer surface of the liquid helium process line. Any traces of helium gas present may be adsorbed in a series of adsorbing units, such as illustrated in FIG. 16, which are placed periodically at convenient locations along the liquid helium process line 40. These adsorbing units consist of a formaminous tubing 250 surrounding and concentric with line 40 and held thereon by two end caps 251. The caps 251 is filled with adsorbing charcoal 252 which is, of course, maintained at or near liquid helium temperature when liquid helium is flowing in process line 40.

In the detailed discussion of FIG. 1 it was pointed out that it may be desirable to incorporate such optional components as a valve, and to construct the line to have ell- and tee-sections to form branch lines, to accommodate the line to a particular space situation, or for any other desired purpose. The incorporation of a valve and the construction of an ell-section are illustrated in FIG. 17 and construction of a tee-section is shown in FIG. 19.

The valve 28, shown in FIG. 17, is a commercially available cryogenic valve and need not be described in detail. If one or more of such valves are used they must, however, be integrated into the transfer line to minimize heat leak into the line system and provide for offset motion in the valve due to expansion and contraction. Since during line use that portion of the valve outside the vacuum jacketing is at normal room temperature while the other end in contact with the helium process line is near liquid helium temperature, a temperature gradient, with its attendant heat leak, could extend along the entire length of the valve. As in the case of bayonet connectors, this heat leak can be reduced to some extent by lengthening the valve stem, but this is not only not practical beyond certain limits but it may also not be possible in some space situations. In the valve installation of this invention the temperature gradient is greatly reduced and the heat leak is intercepted by providing a liquid nitrogen-cooled heat station.

In FIG. 17 valve stem 255, encased in tubing 256, extends in a direction normal to the direction of liquid helium flow and terminates in a valve actuating wheel 257. It passes through a sealed bushing 258 which in turn is fluid-tightly sealed to a flanged collar 259 by means of an o-ring 260. Tubing 256, which serves as a low-temperature valve extension and contributes added stiffness to take some of the load off the radiation shielding, is welded to collar 259 to provide a rigid connection between the room temperature end of the valve and the valve block 261. Because this is a rigid connection and because expansion and contraction will occur in the two directions normal to each other (e.g., in the vertical and horizontal directions as shown in FIG. 17) it is necessary to provide inner flex segments 262 and 263 on either side of the valve body which are capable of taking an offset in the direction normal to the axis of the liquid helium process line 40. The construction of these inner flex segments is shown in FIG. 18. The process line within the inner flex segment is constructed as bellows 264 which are welded at 265 to a coupling member 266 which fits over the end of the process line tubing section 267. Wire cloth 268 is wound around bellows 264 and multilayer insulation 269 is used to cover the wire cloth. Bellows 264 are brazed at the other end at 270 to coupling member 271 which is in turn connected to the inlet of valve body 261 through a connecting member 272. The inherent flexibility of the inner flex seqments 262 and 263 permits the vertical offset required while maintaining the concentricity of the valve stem and transfer line.

The radiation shielding associated directly with the valve comprises a tee-segment 275, two arms of which fit over reducing segments 276 and 277 which in turn are joined to continuing sections of the radiation shielding means generally indicated by reference numberal 41. In the case of reducing segment 276, it is joined to the ell-section described below; and in the case of reducing segment 277, it is joined to straight section 278. Where required, a support mechanism is provided for the radiation shielding means and this is illustrated by support ring 279 placed around the shielding and support rod 280 which connects support ring 279 to the vacuum jacketing 42.

The third arm of tee-section 275 of the radiation shielding fits around a straight tubing segment 285 which surrounds the lower part of valve stem tubing 256 and terminates in a thick copper plate 286 through which tubing 256 passes. This copper plate is a heat station, the purpose of which is to intercept heat flow along tubing 256. Heat station 286 is cooled by the liquid nitrogen coolant circulating in $LN_2$ line 50 which is bonded to radiation tubing segment 285 which in turn is bonded to the heat station. The radiation shielding means around the valve stem is continued in the form of tubing 287 which is bonded, as is valve extension tubing 256, to both radiation shielding and flanged collar 259. The annular spacing 288 defined between tubings 256 and 287 is in fluid communication through openings 289 with spacing 290 which is in turn in fluid communication with the evacuated volume 44 of the transfer line. The volume 291 defined within valve extension tubing 256 contains helium gas.

The $LN_2$ line 50 is looped around tee-segment 275 and reducing segments 276 and 277 of the radiation shielding means to pass around the front (dot-dash lines) then in back (dotted lines) and then in front and it extends up shielding 285 to almost the height of heat station 286.

The vacuum jacketing means, generally shown at 42 of this tee-section of the transfer line comprises a vacuum jacket tee-segment 295 welded at the end of its two horizontal arms to appropriate line sections such as a reducing segment 296 and regular straight line segment 297. The vertical arm of vacuum jacket tee-section is welded to a straight vertical segment 298 which in turn is affixed to a cap segment 299 welded to valve stem collar 259.

It will be seen from FIG. 17 that the construction of an ell-section 30 is similar to that used in one arm of the flexible section of FIGS. 11 and 12. Thus the problems of expansion and contraction and prevention of thermal shorts must be solved. The liquid helium process line comprises an elbow segment 300 making a fit over a vertical segment 301. Although elbow segment 300 is shown here to be connected directly to inner flex segment 262 because of the proximity of the valve, it is, of course, within the scope of this invention to connect the elbow segment to another section of the process line, to a bayonet connector, an expansion joint, or other appropriate component of the line.

The radiation shielding means of the ell-section 30 comprises an elbow segment 305 connected to the reducing segment 276 of the valve radiation shielding through a connector piece 306. As in the case of the liquid helium process line, this radiation shielding elbow segment may be connected to other appropriate radiation shielding configurations in place of segment 276 designed for the proximity of the valve. The other arm of radiation shielding elbow 305 forms a brazed connection with radiation shielding 307 with which there are associated a series of stainless steel spacer tubings 308 and 309 and spacers 310, 311, 312 and 313, the constructions and functions of which are identical to the spacer shields 220 and 221 and spacers 222, 223, 224 and 225 described in conjunction with FIG. 11. Thus spacers 310 are bonded to the inner wall of vacuum jacket means (generally indicated at 42) and to the outer wall of spacer tubing 309; spacers 311 are bonded to the inner wall of spacer tubing 309 and to the outer wall of radiation shielding 307; spacers 312 are bonded to radiation shielding 307 and to spacer tubing 308; and spacers 313 are bonded to spacer tubing 308 but are free to slide on the outer surface of liquid helium process line section 301.

In the ell-section shown in FIG. 17, the $LN_2$ line 50 has a coil segment 315 to provide flexibility in expansion and contraction. The vacuum jacketing of the ell-section comprises an elbow segment 316 joined at one arm to the reducing segment 296 or to any other appropriately configured section and at the other arm to a straight section 317 of the vacuum jacketing means.

FIG. 17 also illustrates the incorporation of an expansion/contraction joint into the line joined by the ell-section. This joint is identical to that illustrated in FIGS. 9 and 10. Also shown is a seal-off valve 318 and a vacuum line 319 leading to a vacuum pump, not shown.

One embodiment of a tee-connection for incorporating a branch transfer line such as illustrated diagrammatically in FIG. 1 is shown in detailed cross section in FIG. 19. In what may, for convenience, be termed the main transfer line (horizontal line of FIG. 19) the liquid helium process line 40 is cut and joined through inner flex segments 325 and 326 (such as shown in FIG. 18) to short process line segments 327 and 328 which are joined by two arms of union tee-socket 329. The liquid helium process branch line 330 is also connected into socket 329.

The radiation shielding means 41 and the vacuum jacketing means 42 are also cut and joined by radiation shielding tee-segment 331 and vacuum jacketing tee-segment 332, respectively. Radiation shielding 333 and vacuum jacketing 334 are joined to their respective tee-segments and serve as these components for the branch transfer line.

The inner flex segments 325 and 326 permit an offset in the branch line in a direction normal to the axis of the main transfer line in the same manner as explained in conjunction with the valve of FIG. 17. As an alternative to the use of the inner flex sections 325 and 326 of FIG. 19 it may be desirable to omit these flex sections and attain the desired flexibility of movement in the branch line by incorporating an expansion/contraction joint such as shown in FIGS. 9 and 10 in the branch line.

The $LN_2$ line 50 for the main transfer line may be wrapped one-half or one full turn around the radiation shielding. It will generally be desirable to provide a separate $LN_2$ line 355 (equivalent in all respects to $LN_2$ 50) for the branch line. $LN_2$ line 335 is shown terminating near the tee-connection. It is coupled by a union socket 336 to a discharge line 337 which passes through the cap end of a vacuum jacketing 338 to be connected with a check valve 339. As pointed out in connection with the discussion of FIG. 1, a transfer line may incorporate more than one source and reservoir to supply the liquid nitrogen coolant. The same arrangement as shown in FIG. 19 may be used to connect the liquid nitrogen sources (e.g., large storage dewars) with the $LN_2$ line, the check valve being replaced by a connection to the $LN_2$ source.

Transfer lines constructed in accordance with this invention incorporating heat stationed-bayonets, expansion/contraction joints and valves and being about 130 feet long have exhibited a total heat leak of 5 watts as compared with about 20 watts for a conventional prior art transfer system of substantially the same general configuration. This clearly illustrates that long liquid helium transfer lines are not only practical but highly efficient when constructed in accordance with this invention.

It will thus be seen that the objects set forth above, among those made apparent from the preceding description, are efficiently attained and, since certain changes may be made in the above construction without departing from the scope of the invention, it is intended that all matter contained in the above description or shown in the accompanying drawings shall be interpreted as illustrative and not in a limiting sense.

We claim

1. A fluid helium transfer line capable of transferring fluid helium between first and second terminals over extended distances with low loss, comprising in combination
  a. a helium process line;
  b. radiation shielding means surrounding said process line throughout essentially the entire length of said process line and defining a first annular spacing therewith;
  c. cryogenic coolant transfer line means for circulating a cryogenic coolant in indirect heat exchange with said radiation shielding means;
  d. vacuum jacketing means defining an evacuatable volume around said process line, said radiation shielding means and said coolant transfer line means, said evacuatable volume including a second annular spacing between said radiation shielding means and said vacuum jacketing means;

e. expansion-contraction joint means in said radiation shielding means and said coolant transfer line means; and f. heat-stationed bayonet connector means terminating each end of said transfer line and arranged to connect said transfer line at said first and second terminals.

2. A fluid helium transfer line in accordance with claim 1 wherein said expansion/contraction joint means comprises, in combination a. first and second abutting sections of said radiation shielding means;

b. coupling means in the form of a sleeve around said abutting sections of said radiation shielding means and internally configured to define.

1. a first section, the diameter of which is sized such that said coupling means forms a close fit over said first section of said radiation shielding means, 2. a second section, the diameter of which is sized such that said coupling means defines a small annular spacing with said second section of said radiation shielding means whereby said second section of said radiation shielding means is free to experience axial motion in said coupling, and 3. a lip between said first and second sections of said coupling to limit said axial motion of said second section of said radiation shielding means, said coupling means being fastened to said first section of said radiation shield means; and c. a coil segment of said coolant transfer line affixed near one of its ends to the external surface of the open end of said second section of said coupling and near the other of its ends to said second section of said radiation shield means; said coolant transfer line being fastened to said first section of said radiation shielding means.

3. A fluid helium transfer line in accordance with claim 1 wherein said heat-stationed bayonet connector means comprises male and female sections engageable to form a continuous fluid helium process line, radiation shielding means therearound and heat station means positioned intermediate between the ends of said radiation shielding means and bonded thereto, whereby when said radiation shielding means are cooled said heat station means is cooled to intercept heat flow along the bayonet connector.

4. A fluid helium transfer line in accordance with claim 3 wherein said heat station means comprises a first annular heat station in said female section intermediate its length and a second annular heat station in said male section intermediate its length and said radiation shielding means comprises a first radiation shield thermally bonded to said first annular heat station and a second radiation shield thermally bonded to said second heat station.

5. A fluid helium transfer line in accordance with claim 4 including cooling means to cool at least one of said radiation shields.

6. A fluid helium transfer line in accordance with claim 5 including a compressible thermal conducting ring between said first and second heat stations providing thermal engagement of said first and second annular heat stations and cooling means to cool one of said radiation shields.

7. A fluid helium transfer line in accordance with claim 6 wherein said cooling means comprises said cryogenic coolant transfer line thermally bonded to said one of said radiation shields.

8. A fluid helium transfer line in accordance with claim 6 wherein said cooling means comprises radiation shield cooling means associated with said terminals.

9. A fluid helium transfer line in accordance with claim 5 including cooling means to cool both of said radiation shields separately.

10. A fluid helium transfer line in accordance with claim 9 wherein said cooling means comprises separate sections of said cryogenic coolant transfer line bonded to said first and second radiation shields and bypass means connecting said separate sections of said cryogenic coolant transfer line.

11. A fluid helium transfer line in accordance with claim 10 wherein said bypass means comprises in combination, first and second bayonet connector means having coolant process line means and vacuum jacketing means and being joined through a flexible section formed of inner bellows means coupled to said vacuum jacketing means and insultation means interposed between said inner and outer bellows means.

12. A fluid helium transfer line in accordance with claim 1 including flexible section means associated with at least one of said bayonet connector means terminating said line, said flexible section means being joined to said transfer line through a second heat-stationed bayonet connector means.

13. A fluid helium transfer line in accordance with claim 12 wherein said flexible section means comprises in combination a. two rigid segments of said transfer line, at least one of which is configured as an elbow;

b. a flexible segment, joining said rigid segments, wherein said liquid helium process line comprises inner bellows means, said vacuum jacketing means comprises outer bellows means and said cryogenic coolant line is in the form of a coolant line coil interposed between said inner and outer bellows means, and including insulation means between said inner bellows means and said collant line coil and between said coolant line coil and said outer bellows means;

c. first adapter coupling means joining said liquid helium process line in said rigid segments to said inner bellows means;

d. second adapter coupling means joining said vacuum jacketing means of said rigid segments to said outer bellows means;

e. aligning means within the ends of said rigid segments adjacent said flexible segment for preventing contact between said helium process and said radiation shielding means in said rigid segments; and f. means at the ends of said rigid segments remote from said flexible segment for coupling said liquid helium process line, said radiation shielding means and said vacuum jacketing means to said bayonet connector means terminating said line and to said second bayonet connector means.

14. A fluid helium transfer line in accordance with claim 13 wherein both of said rigid segments are configured as elbows.

15. A fluid helium transfer line in accordance with claim 13 wherein said aligning means comprises concentric, low thermal conductivity spacer tubings located between said liquid helium process line and said radiation shielding means and between said radiation shielding means and said vacuum jacketing means thereby forming within said transfer line a series of concentric annular spaces defined between the walls of said process line, said radiation shielding means and said vacuum jacketing means; and spacers within said annular spaces, each of said spacers except the innermost spacer being bonded to the said walls defining the annular space within which it is located, said innermost spacer being free to slide on the outer surface of said process line.

16. A fluid helium transfer line in accordance with claim 13 wherein said inner and outer bellows means are covered by wire cloth.

17. A fluid helium transfer line in accordance with claim 12 wherein said second heat-stationed bayonet connector means comprises, in combination;
   a. male and female sections engageable to form a continuous fluid helium process line;
   b. a first annular heat station in said female section intermediate its length;
   c. a second annular heat station in said male section intermediate its length;
   d. a first radiation shield thermally bonded to said first annular heat station;
   e. a second radiation shield thermally bonded to said second annular heat station;
   f. separate sections of said cryogenic coolant transfer line means thermally bonded to said first and second radiation shields; and
   g. bypass means connecting said separate sections of said cryogenic coolant transfer line means.

18. A fluid helium transfer line in accordance with claim 1 wherein said radiation shielding means is periodically apertured to provide fluid communcation between said first and second annular spacings.

19. A fluid helium transfer line in accordance with claim 1 including insulation means located within said first and said second annular spacings.

20. A liquid helium transfer line in accordance with claim 19 wherein said insulation is multilayer insulation formed of a plurality of layers of an aluminized resin film.

21. A liquid helium transfer line in accordance with claim 1 including helium adsorbing means affixed to said helium process line.

22. A liquid helium transfer line in accordance with claim 21 wherein said helium adsorbing means comprises a foraminous tubing surrounding said helium process line and defining therewith an annular spacing, cap means terminating said spacing, and an adsorbent charcoal in said spacing.

23. A fluid helium transfer line in accordance with claim 1 including valve means for controlling the flow of helium within said helium process line, said valve means comprising, in combination
   a. valve body means having fluid inlet and outlet ports;
   b. valve stem means extending in a direction normal to the direction of helium flow in said helium process line;
   c. flexible helium process line segments connecting said helium process line to said inlet and outlet ports of said valve body;
   d. valve stem vacuum jacketing means coupled to said vacuum jacketing means surrounding the greater part of the length of said valve stem means and defining an evacuatable space therearound;
   e. valve stem radiation shielding means coupled to said radiation shielding means and having heat station means bonded thereto;
   f. tubing means defining a fluid-tight spacing around said valve stem means bonded to said heat station means;
   g. said cryogenic coolant transfer line being in the form of a loop around said valve stem radiation shielding means extending to within a short distance of said heat station.

24. A fluid helium transfer line in accordance with claim 23 wherein flexible helium process line segments comprise, in combination;
   a. bellows means;
   b. wire cloth covering said bellows mean; and
   c. multilayer insulation wrapped around said wire cloth.

25. A fluid helium transfer line in accordance with claim 1 including an ell-section comprising, in combination
   a. a transfer line segment having a helium process line segment, a radiation shielding means segment and a vacuum jacketing means segment joined through elbow means to said helium process line, said radiation shielding means and said vacuum jacketing means, respectively; and
   b. alignment means within said transfer line segment adjacent said elbow means for preventing contact between said helium process line and said radiation shielding means.

26. A fluid helium transfer line in accorance with claim 25 wherein said aligning means comprises concentric, low thermal conductivity spacer tubings located between said helium process line segment and said radiation shielding means segment and between said radiation shielding means segment and said segment vacuum jacketing means segment thereby forming within said segment transfer line a series of concentric annular spaces defined between the walls of said segment process line, said radiation shielding means segment and said vacuum jacketing means segment; and spacers within said annular spaces, each of spacers except the innermost spacer being bonded to the said walls defining the annular space within which it is located, said innermost spacer being free to slide on the other surface of said process line segment.

27. A fluid helium transfer line in accordance with claim 1 including a tee-section comprising, in combination a branch transfer line having a branch liquid helium process line, branch radiation shielding means, and branch vacuum jacketing means, said branch radiation shielding means and said branch vacuum jacketing means being joined through tee-shaped means to said radiation shielding means and said vacuum jacketing means, respectively, and said branch liquid helium process line being joined to said helium process line through a union tee-socket; and means to permit offset motion of said branch transfer line in a direction normal to the direction of helium flow in said helium transfer line.

28. A fluid helium transfer line in accordance with claim 27 wherein said means to permit offset motion comprises a flexible helium process line segment including, in combination
   a. bellows means;
   b. wire cloth covering said bellows means; and
   c. multilayer insulation wrapped around said wire cloth.

29. A fluid helium transfer line capable of transferring fluid helium between first and second terminals over extended distances with low loss, comprising in combination:
a. a helium process line;
b. radiation shielding means surrounding said process line throughout essentially the entire length of said process line and defining therewith an inner evacuatable spacing;
c. thermal insulation within said inner evacuatable space;
d. vacuum jacketing means defining an outer evacuatable spacing in fluid communication with said inner evacuated spacing;
e. thermal insulation within said outer evacuatable spacing;
f. cryogenic coolant transfer line means for circulating a cryogenic coolant in indirect heat exchange with said radiation shielding means;
g. expansion/contraction joint means in said radiation shielding means and said coolant transfer line means;
h. heat-stationed bayonet connector means terminating each end of said transfer line and arranged to connect said transfer line at said first and second terminals; and
i. flexible section means associated with at least one of said bayonet connector means terminating said line and joined to said line through a second heat-stationed bayonet connector means.

30. A fluid helium transfer line in accordance with claim 29 including valve means for controlling the flow of helium within said helium process line.

31. A fluid helium transfer line in accordance with claim 29 including a tee-section.

* * * * *